Nov. 30, 1954   H. B. WHITE   2,695,798
PIPE COUPLING
Filed July 7, 1951
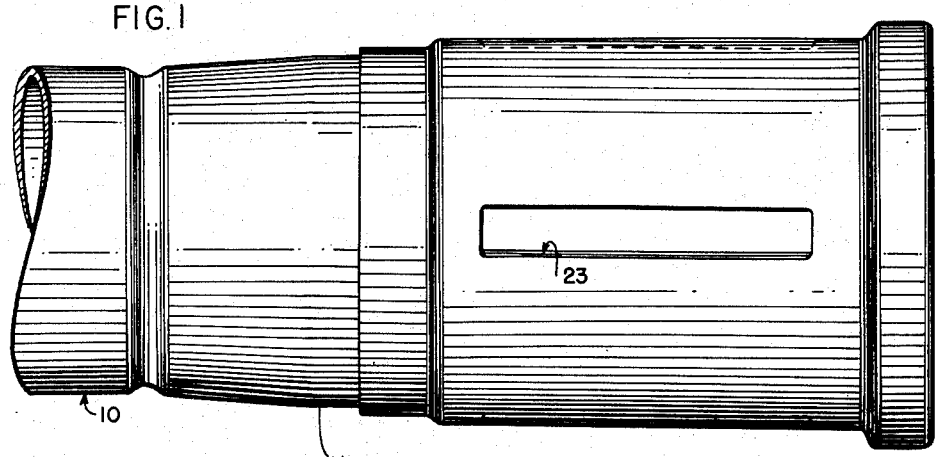
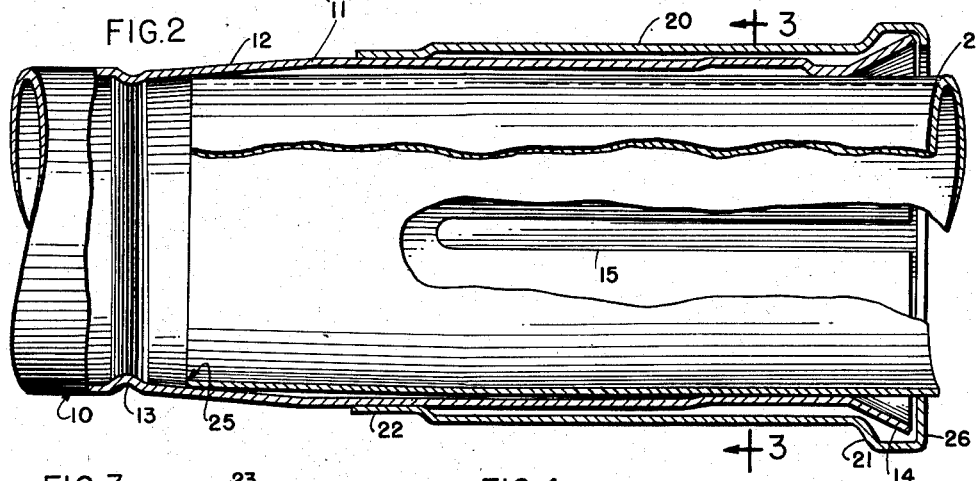
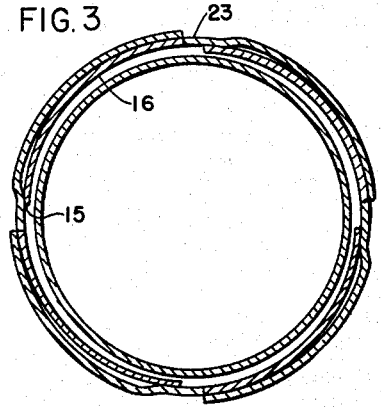
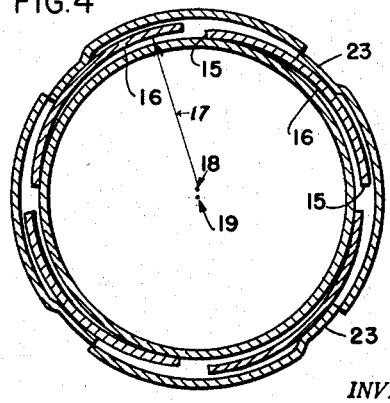
INVENTOR:
HARRY B. WHITE
BY
*Harry S. Dumars*
ATTORNEY United States Patent Office 2,695,798
Patented Nov. 30, 1954

2,695,798

PIPE COUPLING

Harry B. White, Canton, Ohio, assignor to The Hoover Company, North Canton, Ohio, a corporation of Ohio Application July 7, 1951, Serial No. 235,589

11 Claims. (Cl. 285—180)

This invention relates to an improved pipe coupling and more particularly to a simple and inexpensive coupling for use on thin walled tubular members.

There are many applications in which there is an urgent demand for a low cost, quickly releasable, positive coupling for tubular members. One of these applications, by way of example, is on suction lines for use with suction cleaners where it is desirable to adjust the length of the line for different cleaning operations or to substitute different cleaning tools for various cleaning chores.

Prior couplings are unsatisfactory for numerous reasons. In general, they are too costly, difficult to operate, and subject to accidental uncoupling. The present invention entirely overcomes the disadvantages of couplings heretofore proposed and provides a construction characterized by its ruggedness, simplicity, high efficiency, ease of operation, low cost and its highly effective clamping action.

These and other advantages will become apparent from the following detailed specification taken with the accompanying drawings in which:

Figure 1 is a side view of the female portion of the coupling;

Figure 2 is a longitudinal sectional view through the assembled coupling;

Figure 3 is a cross sectional view on line 3—3 of Figure 2 showing the position of parts before the locking ring is rotated to clamp the coupling members together; and Figure 4 is a view similar to Figure 3 but showing the coupling members securely clamped together.

The invention is here illustrated as applied to the mating end of a pair of thin walled metal conduit sections used in forming the wand on the end of a flexible suction cleaner hose. Since the invention is confined to the means for coupling the conduit sections together, the entire conduit is not illustrated but will be understood to be of a size and length customarily used in the suction cleaner art.

The female section is formed on one end of a conduit section 10 which is expanded to a slightly greater diameter for a matter two to four inches from one of its ends. This enlarged diameter portion 11 is connected to the main body of the tube by a frusto-conical section 12 and an annular bead 13. The entrance end of portion 11 is flared at 14, as clearly illustrated in Figure 2, to provide a guiding pilot for the male end of the mating conduit as well as an assembly retainer for the clamping as will become clear below.

Extending longitudinally of enlarged portion 11 for the greater portion of its length are a plurality of open end slots 15. Four such slots are present in the embodiment illustrated, but it is to be understood that the number may be varied as desired for best results with a particular tubing. The sectors 16 formed by slots 15 are slightly deformed or twisted so that their axis of curvature is parallel to but offset slightly to one side of the axis of conduit section 10 as a whole. This will be clear from Figures 3 and 4 in which it will be observed that the radius 17 of sectors 16 evolves from a center 18 offset slightly to one side of the axis 19 of conduit 10.

Surrounding clamping sectors 16 is a control sleeve 20 of slightly greater internal diameter than the exterior diameter of portion 11. This sleeve has a channeled rim 21 which embraces the flared portion 14 of the coupling. The opposite or rear end of sleeve 20 is reduced slightly to provide a bearing 22 journalled about portion 11.

Sleeve 20 is slit longitudinally at equi-spaced points to provide lips 23. These lips are depressed the slight amount necessary to ride on the trailing or depressed edge of sectors 16, as clearly indicated in Figure 3. It will therefore be manifest that as sleeve 20 is rotated clockwise, lips 23 will depress sectors 16 rigidly inward and that the amount of depression will increase as lip 23 approaches the leading edge of sector 16.

As will be self-evident from Figure 2, initial assembly of the female portion of the coupling is accomplished merely by inserting the channeled end 21 of sleeve 20 over the small diameter end of conduit 10, then moving it axially along the conduit until flange 26 engages flared portion 14 causing the sectors 16 to move radially inward until flange 26 overrides flared portion 14. The engagement of the ends of flared portion 14 with flange 26 then holds the sleeve in permanently assembled relation on conduit 10.

The male portion of the coupling comprises the straight cylindrical end of a second section of conduit 24. The diameter of this conduit is identical with that of the main body portion of conduit 10. Hence, when the straight end of conduit 24 is telescoped into the female portion of the coupling its end 25 will engage the inner side wall of frusto-conical portion 12 of the coupling and form an airtight seal at this point. Conduits 10 and 24 are then positively clamped together by rotating sleeve 20 so that lips 23 depress sectors 16 into firm frictional engagement with the underlying portions of conduit 24. Release of the coupling is effected merely by rotating sleeve 20 counter-clockwise allowing sectors 16 to move outwardly to their initial position under their inherent resiliency thereby completely releasing section 24 for uncoupling.

While I have shown but a single modification of my invention it is to be understood that this modification is to be taken as illustrative only and not in a limiting sense. I do not wish to be limited to the particular structure shown and described but to include all equivalent variations thereof except as limited by the scope of the claims.

I claim:

1. A quickly releasable coupling for thin-walled tubular members comprising, a female member having a plurality of open ended slots extending axially thereof from the inlet end and providing a plurality of elongated resilient tongues between said slots, at least one of said tongues being deformed from its circular contour so that one longitudinal edge thereof is at a shorter radial distance from the axis of said female member than the opposite longitudinal edge thereof, a sleeve journaled about the exterior of said female member having at least one indentation therein positioned to engage said deformed tongue and to depress the same when said sleeve is rotated in one direction through a partial revolution and to become disengaged therewith as said sleeve is rotated in the opposite direction whereby said tongue can be depressed into firm locking engagement with the surface of a male tubular member telescopically positioned in said female or disengaged therefrom as said sleeve is rotated through a partial revolution.

2. A quickly releasable coupling for thin walled tubular members comprising, a female member having a plurality of open ended slots extending longitudinally of said member from one end thereof to form a plurality of thin resilient tongues therebetween, said tongues being twisted slightly in a direction parallel to the axis of said tubular member so that each tongue has an elongated leading edge at a shorter radial distance from said axis than the opposite trailing edge thereof, a sleeve member journaled about said female member having a plurality of depressions spaced circumferentially of said sleeve and positioned to depress said tongues radially inward as said sleeve is rotated in one direction through a partial revolution and to relieve the pressures on said tongues as said sleeve is rotated in the opposite direction through a partial revolution whereby the leading edges of said tongues may be moved into and out of tight gripping contact with the surface of a male tubular member telescopically seated within said female member depending upon the direction in which said sleeve is rotated.

3. A quickly releasable coupling for thin walled tubular members as defined in claim 1 wherein the inlet end of said female member is flared outwardly to provide a guiding pilot for the male member of said coupling.

4. A quickly releasable coupling for thin walled tubular members as defined in claim 1 wherein the inlet end of said female member is flared outwardly, the adjacent end of said sleeve having an inwardly opening annular channel adapted to override said flared end as said sleeve is assembled axially over said female member and to thereafter hold assembled to said female member by the engagement of said flared end in said channel.

5. A quickly releasable coupling for thin walled tubular members as defined in claim 2 wherein said female member is provided with a tapered section rearwardly of the closed ends of said slots, the larger diameter portion of said tapered section being nearest said slots whereby said tapered section receives the innermost end of the male member in air tight sealing engagement irrespective of slight manufacturing variations in the tolerances of the diameters of the male and female members.

6. A quickly releasable coupling for thin walled tubular members comprising, a female member slotted longitudinally thereof from the inlet end to provide a plurality of resilient tongues, the outer, free ends of said tongues being flared outwardly, a sleeve surrounding said female member for a distance greater than the length of said slots to enclose the same, the outer end of said sleeve having an inwardly opening annular channel for receiving and seating the outer ends of said flared tongues whereby said tongues hold said sleeve in assembled position on said coupling while leaving the sleeve free for rotary movement on said coupling.

7. A quickly releasable coupling as defined in claim 6 wherein said sleeve includes an annular section of reduced diameter providing a rotary bearing between said sleeve and said female member.

8. In combination, a length of thin walled conduit having a section of slightly enlarged diameter at one end forming the female portion of a coupling for joining said conduit to the non-enlarged end of a similar length of conduit, said female portion having a plurality of open ended slots extending axially thereof from the inlet end to form a plurality of resilient tongues therebetween, said tongues being slightly twisted about an axis extending longitudinally thereof to provide a leading edge at a shorter radial distance from the axis of the conduit than the opposite trailing edge thereof, a clamping sleeve journaled about the exterior of said female portion having at least one indentation therein positioned to engage and depress one of said twisted tongues as the sleeve is rotated through a partial revolution whereby the leading edge thereof is depressed into firm gripping relation with the exterior non-enlarged end portion of a conduit telescoped into said female portion and whereby said tongue becomes disengaged from said last mentioned conduit when said sleeve is reversely rotated through a partial revolution.

9. The combination defined in claim 8 wherein said clamping sleeve is provided with a plurality of indentations arranged in circumferentially spaced relation and engageable one with each of said twisted tongues as said sleeve is rotated through a revolution to cause the leading edges of said tongues to frictionally engage the non-enlarged end of a conduit telescoped in the female portion of said first mentioned conduit.

10. The combination defined in claim 8 wherein the free ends of said twisted tongues are flared outwardly and fit into an inwardly opening annular groove formed in the rim edge of said clamping sleeve to hold said sleeve assembled to the enlarged end of said thin walled conduit.

11. The combination defined in claim 8 wherein the enlarged end of said thin walled conduit is integrally connected to the body of the conduit by a short frusto-conical section against the sloping inner wall of which the non-enlarged end of another conduit may seat in air tight engagement when telescoped into said enlarged end portion.

References Cited in the file of this patent

UNITED STATES PATENTS

| Number | Name | Date |
|---|---|---|
| 459,951 | Warner | Sept. 22, 1891 |
| 2,412,664 | Wolfram | Dec. 17, 1946 |

FOREIGN PATENTS

| Number | Country | Date |
|---|---|---|
| 125,016 | Great Britain | Apr. 10, 1919 |